United States Patent Office 3,515,726
Patented June 2, 1970

---

3,515,726
2,2'-BIS(PYRIDYL-N-OXIDE) DITHIOLCARBONATES AND TRITHIOCARBONATES
Rudiger D. Haugwitz, New Haven, Conn., assignor to Olin Mathieson Chemical Corporation, a corporation of Virginia
No Drawing. Filed Oct. 16, 1968, Ser. No. 768,171
Int. Cl. C07d 31/50
U.S. Cl. 260—294.8                                4 Claims

ABSTRACT OF THE DISCLOSURE

Selected dithiolcarbonates and trithiocarbonates are prepared by reacting various 2-mercaptopyridine N-oxides with phosgene and thiophosgene in the presence of a base. These compounds have been found to be effective biocides for a wide variety of applications.

---

This invention relates to 2,2'-bis(pyridyl-N-oxide)dithiolcarbonates and trithiocarbonates. More particularly, this invention relates to compounds having the formula

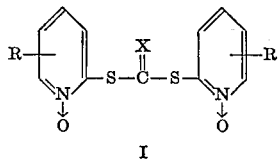

I wherein R is hydrogen, lower alkyl or lower alkoxy; and X is oxygen or sulfur.

2-mercaptopyridine-N-oxide and various derivatives thereof have been previously reported in the literature. For example, U.S. Pat. 2,686,786 discloses that 2-mercaptopyridine-N-oxide, and lower alkyl and lower alkoxy substituted 2 - mercaptopyridine - N - oxides, are active against a wide group of microorganisms.

Now it has been found in accordance with this invention that dithiolcarbonates and trithiocarbonates can be prepared from selected 2-mercaptopyridine-N-oxides. Furthermore, these dithiolcarbonates and trithiocarbonates I have been found to be stable and highly effective biocides.

The compounds I of this invention are readily prepared by reacting appropriate 2-mercaptopyridine-N-oxides with phosgene or thiophosgene in the presence of a base according to the following equation wherein R is hydrogen, lower alkyl or lower alkoxy, the lower referring to moieties containing 1–4 carbon atoms; and X is oxygen or sulfur.

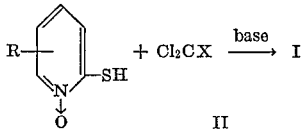

II

Reaction of the 2-mercaptopyridine-N-oxides II with phosgene provides dithiolcarbonates, i.e., compounds I wherein X is oxygen, while reaction with thiophosgene provides trithiocarbonates, i.e., compounds I wherein X is sulfur.

The 2-mercaptopyridine-N-oxides II employed as reactants in the preparation of the dithiolcarbonates and trithiocarbonates I are more fully described in the aforementioned U.S. Pat. 2,686,786. Illustrative 2-mercaptopyridine-N-oxides II include 2-mercaptopyridine-N-oxide, 3-methyl-2-mercaptopyridine-N-oxide, 4 - (tert - butyl)-2-mercaptopyridine-N-oxide, and 3-ethoxy-2-mercaptopyridine-N-oxide.

While any 2-mercaptopyridine-N-oxide having the Formula II can be employed in the preparation of the dithiolcarbonates and trithiocarbonates I, preferred embodiments of this invention employ those compounds II wherein R is hydrogen or lower alkyl.

The dithiolcarbonates and trithiocarbonates I are prepared by reacting the appropriate 2-mercaptopyridine-N-oxide II with phosgene or thiophosgene in the presence of a base and recovering the desired reaction product. While the reaction temperature is not critical to the obtainment of compounds I, temperatures of about 0° to about 30° C. are preferably employed.

A wide variety of suitable bases can be employed in the preparation of the compounds of this invention. For example, pyridine, N,N-dimethylaniline, and triethylamine have been found to be particularly suitable.

While it is feasible to prepare compounds I in the absence of a solvent, preferably an aprotic solvent system is employed. Thus, solvents such as chloroform, dichloromethane, benzene, toluene, ether, dimethylformamide, dimethylsulfoxide, etc., can be used.

The desired 2,2'-bis(pyridyl-N-oxide)dithiolcarbonates and trithiocarbonates are obtained in excellent purity and are readily isolated by conventional techniques such as filtration, chromotography, crystallization, etc.

The dithiolcarbonates and trithiocarbonates I of this invention have broad anti-bacterial and anti-fungal spectra and thus are excellent biocides. They have been found to be particularly effective in those applications where stability is a factor. For example, they are employed as biocides for soaps, vinyl resins, latex paints, etc.

As a further illustration of the effectiveness of these compounds, 2,2'-bis(pyridyl-N-oxide)trithiocarbonate and 2,2'-bis(pyridyl-N-oxide)dithiolcarbonate were found to be excellent biocides when incorporated into polyethylene resins prior to fabrication of the plastic.

The following examples will serve to illustrate the preparation of various 2,2' - bis(pyridyl-N-oxide)dithiolcarbonates and trithiocarbonates I in accordanec with the practice of this invention.

EXAMPLE I

A solution of 5.7 g. of thiophosgene in 20 ml. of methylene-chloride was added, with stirring and ice-bath cooling, to a solution of 14 g. of 2-mercaptopyridine-N-oxide in 150 ml. of methylene-chloride and 10 ml. of pyridine. The reaction mixture turned dark slowly and a tan-colored precipitate separated therefrom. After stirring for two hours at room temperature, the reaction mixture was filtered to provide 8 g. of solid product, M.P. 78° C. (decomp.). The following analytical data revealed that 2,2'-bis(pyridyl-N-oxide)trithiocarbonate had been obtained.

*Analysis.*—Calc'd for $C_{11}H_8N_2O_2S_3$ (percent): C, 44.57; H, 2.66; N, 9.45. Found (percent): C, 44.26; H, 2.90; N, 9.73.

EXAMPLE II

To a solution of 6.4 g. of 2-mercaptopyridine-N-oxide dissolved in 100 ml. of dry chloroform was added 4 g. of pyridine. The resulting solution was chilled to ice bath temperature and a solution of 19 ml. of dry chloroform containing 2.45 g. of phosgene was added dropwise with stirring. After completion of the addition, the ice bath was removed and the stirring was continued for 60 minutes; then the solvent was evaporated in vacuo. The oily residue was treated with 50 ml. of water, exhaustively extracted with chloroform, and the combined chloroform extractions washed with 50 ml. of 5 percent sodium bicarbonate solution and again with 20 ml. of water. After drying, the chloroform extracts were evaporated and the oily residue triturated with ethyl ether to provide 1.5 g. of solid. The mother liquor, on standing and trituration with ethyl alcohol furnished an additional 0.5 g. of solid. Chromatography of the combined solids on neutral alumina using chloroform as eluant furnished a white solid, which was recrystallized from chloroform/ethyl ether to provide the product, M.P. 219° C. The following analytical data revealed that 2,2'-bis(pyridyl-N-oxide) dithiolcarbonate had been obtained.

Analysis.—Calc'd for $C_{11}H_8N_2O_3S_2$ (percent): C, 47.81; H, 2.92; N, 10.14. Found (percent): C, 47.44; H, 2.96; N, 10.15.

EXAMPLE III

The biocidal activity of the compounds of Examples I and II is illustrated by the following in vitro spectra of these compounds, wherein the minimal inhibitory concentration (M.I.C.) is given in micrograms/ml.

TABLE

| Organism | MIC | |
|---|---|---|
| | Example I | Example II |
| Staphylococcus aureus | 0.09 | <1.5 |
| Bacillus subtilis | 0.02 | |
| Streptococcus faecalis | 0.78 | 12 |
| Klebsiella pneumoniae | 2.4 | |
| Pseudomonas aeruginosa | 37.5 | 25 |
| Proteus vulgaris | 9.4 | |
| Escherichia coli | 3.9 | |
| Salmonella schottmuelleri | 4.7 | |
| Aerobacter aerogenes | 2.4 | 4.5 |
| Mycobacterium tuberculosis | 0.006 | |
| Desulfovibrio desulfuricans | 1.4 | |
| Candida albicans | 1.9 | |
| Penicillium notatum | 0.19 | |
| Trichophyton mentagrophytes | 0.28 | |
| Aspergillus fumigatus | 0.19 | |
| Aspergillus niger | 0.78 | |
| Pullularia pullulans | 0.39 | |
| Lactobacillus casei | | 18 |
| Proteus vulgaris | | 3.0 |

What is claimed is:
1. A compound having the formula

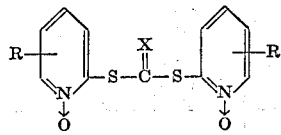

wherein R is hydrogen or lower alkyl and X is oxygen or sulfur.
2. The compound of claim 1 where R is hydrogen.
3. 2,2'-bis(pyridyl-N-oxide)trithiocarbonate.
4. 2,2'-bis(pyridyl-N-oxide)dithiolcarbonate.

References Cited

UNITED STATES PATENTS 3,151,024   9/1964   D-Amico et al. _____ 167—33
3,234,228   2/1966   Johnston et al. _____ 260—294.8

ALAN L. ROTMAN, Primary Examiner

U.S. Cl. X.R.

424—263; 252—177